(12) United States Patent
Vichare et al.

(10) Patent No.: US 11,422,601 B2
(45) Date of Patent: Aug. 23, 2022

(54) METHODS AND SYSTEMS FOR ADVANCED BATTERY CHARGE CAPACITY FORECASTING

(71) Applicant: Dell Products, L.P., Round Rock, TX (US)

(72) Inventors: Nikhil Manohar Vichare, Austin, TX (US); Michael Nechay, Austin, TX (US); Richard C. Thompson, Cedar Park, TX (US); Tyler Ryan Cox, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 309 days.

(21) Appl. No.: 16/803,103

(22) Filed: Feb. 27, 2020

(65) Prior Publication Data
US 2021/0271303 A1 Sep. 2, 2021

(51) Int. Cl.
| G06F 1/00 | (2006.01) |
| G06F 1/28 | (2006.01) |
| G06N 5/04 | (2006.01) |
| G06N 20/00 | (2019.01) |
| H02J 7/00 | (2006.01) |
| G06F 1/30 | (2006.01) |

(52) U.S. Cl.
CPC ............ *G06F 1/28* (2013.01); *G06N 5/04* (2013.01); *G06N 20/00* (2019.01); *H02J 7/0047* (2013.01); *G06F 1/30* (2013.01)

(58) Field of Classification Search
CPC ............ G06F 1/28; G06N 20/00; G06N 5/04

USPC ........................................................ 713/340
See application file for complete search history.

(56) References Cited

U.S. PATENT DOCUMENTS

| 4,949,046 | A | * | 8/1990 | Seyfang | G01R 31/3828 |
| | | | | | 340/636.15 |
| 6,885,952 | B1 | * | 4/2005 | Hayes | G01D 3/08 |
| | | | | | 714/724 |
| 6,924,622 | B1 | * | 8/2005 | Anbuky | G01R 31/3835 |
| | | | | | 320/132 |
| 9,425,630 | B2 | * | 8/2016 | Banerjee | H02J 7/0069 |
| 11,217,833 | B1 | * | 1/2022 | Hom | H01M 10/425 |
| 2011/0035614 | A1 | * | 2/2011 | Hughes | H01M 10/48 |
| | | | | | 713/340 |
| 2013/0311124 | A1 | * | 11/2013 | van Bremen | H01M 10/4207 |
| | | | | | 702/104 |

(Continued)

*Primary Examiner* — Volvick Derose
(74) *Attorney, Agent, or Firm* — Fogarty LLP

(57) ABSTRACT

The measured capacity of a rechargeable battery provides the full charge capacity of the battery, but does not reflect degradation of the battery capacity between measurements. Embodiments initiate a first measurement of a rechargeable battery capacity. Parameters of use of the rechargeable battery are monitored, such as the depth and number of discharge cycles of the battery. Until a second capacity measurement is initiated, a battery capacity correction factor is generated based on the monitored parameters of the use of the rechargeable battery. During this interval until the second measurement, a remaining available capacity of the rechargeable battery is reported based on an adjustment of the first capacity measurement using the generated correction factor. The correction factor for a particular battery may be based on learned battery degradation for a large number of batteries and also based on events and conditions of use of that particular battery.

20 Claims, 4 Drawing Sheets

(56) References Cited

U.S. PATENT DOCUMENTS

| | | | |
|---|---|---|---|
| 2014/0225571 A1* | 8/2014 | Obata | H02J 7/007 320/136 |
| 2015/0088443 A1* | 3/2015 | Lorin | G01R 31/3842 702/63 |
| 2015/0256004 A1* | 9/2015 | Miller | H02J 7/0013 320/162 |
| 2018/0143257 A1* | 5/2018 | Garcia | G01R 31/382 |
| 2018/0372805 A1* | 12/2018 | Fischer | G01R 31/3648 |
| 2019/0033388 A1* | 1/2019 | Karner | H01M 10/425 |
| 2021/0271303 A1* | 9/2021 | Vichare | G06F 1/28 |

\* cited by examiner

METHODS AND SYSTEMS FOR ADVANCED BATTERY CHARGE CAPACITY FORECASTING

FIELD

This disclosure relates generally to Information Handling Systems (IHSs), and more specifically, to powering portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries when the portable IHS is not coupled to a power source. Power drawn from a source, such as an AC electrical outlet, may be converted to DC power and used to recharge the batteries of a portable IHS. When the IHS is unplugged from a power source, the IHS draws power stored in the rechargeable batteries in order to power operations of the IHS. During periods of operation from stored battery power, estimates may be generated of the amount of charge remaining in a battery, such as a percentage of the battery capacity that remains available for use. The capacity of a rechargeable battery for retaining charge degrades over time, with the rate of degradation being affected by factors such as the number and depth of discharge cycles of the battery.

SUMMARY

In various embodiments, methods are provided for powering a first Information Handling System (IHS). The methods may include: initiating a first measurement of a capacity of a rechargeable battery of the first IHS; monitoring a plurality of parameters of use of the rechargeable battery; until a second measurement of the capacity of the rechargeable battery is initiated: generating a battery capacity correction factor based on the monitored parameters of the use of the rechargeable battery; and reporting a remaining available capacity of the rechargeable battery based on an adjustment of the first capacity measurement using the generated correction factor.

In additional method embodiments, the first capacity measurement is initiated in response to detecting the remaining available capacity below a specified threshold. In additional method embodiments, a difference between the first capacity measurement and the second capacity measurement corresponds to degradation of a full charge capacity of the rechargeable battery during the time interval between the first capacity measurement and the second capacity measurement. In additional method embodiments, a portion of the monitored parameters of the use of the rechargeable battery are collected by a battery management unit of the first IHS. In additional method embodiments, the monitored parameters of the use of the rechargeable battery comprise a number of discharge cycles and a depth of discharge cycles of the rechargeable battery. In additional method embodiments, the monitored parameters of the use of the rechargeable battery comprise intervals of discharge rate of the rechargeable battery within a discharge rate zone. In additional method embodiments, the monitored parameters of the use of the rechargeable battery comprise detected temperatures of the rechargeable battery. In additional method embodiments, the monitored parameters of the use of the rechargeable battery comprise intervals of detected temperatures of the rechargeable battery within a temperature zone. In additional method embodiments, the battery capacity correction factor is generated by a first machine learning model trained in part using aggregated parameters of use of rechargeable battery of a plurality of IHSs. In additional method embodiments, the battery capacity correction factor is further generated by a second machine learning model trained in part using monitored parameters of the use of the rechargeable battery of the first IHS.

In various additional embodiments, Information Handling Systems (IHSs) may include: one or more processors; a memory device coupled to the one or more processors, the memory device storing computer-readable instructions that, upon execution by the one or more processors, cause execution of an operating system of the IHS; a rechargeable battery system; and an embedded controller comprising a memory having program instructions stored thereon that, upon execution by a logic unit of the embedded controller, cause the embedded controller to: initiate a first measurement of a capacity of the rechargeable battery system; monitor a plurality of parameters of use of the rechargeable battery system; until a second measurement of the capacity of the rechargeable battery is initiated: generate a battery capacity correction factor based on the monitored parameters of the use of the rechargeable battery system; and report a remaining available capacity of the rechargeable battery system based on an adjustment of the first capacity measurement using the generated correction factor.

In additional IHS embodiments, the first capacity measurement is initiated in response to detecting the remaining available capacity below a specified threshold. In additional IHS embodiments, a difference between the first capacity measurement and the second capacity measurement corresponds to degradation of a full charge capacity of the rechargeable battery system during the time interval between the first capacity measurement and the second capacity measurement. In additional IHS embodiments, a portion of the monitored parameters of the use of the rechargeable battery system are collected by a battery management unit of the rechargeable battery system. In additional IHS embodiments, the monitored parameters of the use of the rechargeable battery system comprise at least one of: a number of discharge cycles of the rechargeable battery system, a depth of discharge cycles of the rechargeable battery, intervals of discharge rate of the rechargeable battery system within a discharge rate zone, detected temperatures of the rechargeable battery system, and intervals of detected temperatures of the rechargeable battery system within a temperature zone.

In various additional embodiments, computer-readable storage devices are provided having program instructions stored thereon that, upon execution by a one or more processors, cause the one or more processors to: initiate a first measurement of a capacity of a rechargeable battery of an IHS (Information Handling System); monitor a plurality of parameters of use of the rechargeable battery; until a second measurement of the capacity of the rechargeable battery is initiated: generate a battery capacity correction factor based on the monitored parameters of the use of the rechargeable battery; and report a remaining available capacity of the rechargeable battery based on an adjustment of the first capacity measurement using the generated correction factor.

In additional storage device embodiments, the first capacity measurement is initiated in response to detecting the remaining available capacity below a specified threshold. In additional storage device embodiments, a difference between the first capacity measurement and the second capacity measurement corresponds to degradation of a full charge capacity of the rechargeable battery during the time interval between the first capacity measurement and the second capacity measurement. In additional storage device embodiments, a portion of the monitored parameters of the use of the rechargeable battery are collected by a battery management unit of the IHS. In additional storage device embodiments, the monitored parameters of the use of the rechargeable battery comprise at least one of: a number of discharge cycles of the rechargeable battery, a depth of discharge cycles of the rechargeable, intervals of discharge rate of the rechargeable battery within a discharge rate zone, detected temperatures of the rechargeable battery, and intervals of detected temperatures of the rechargeable battery within a temperature zone.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
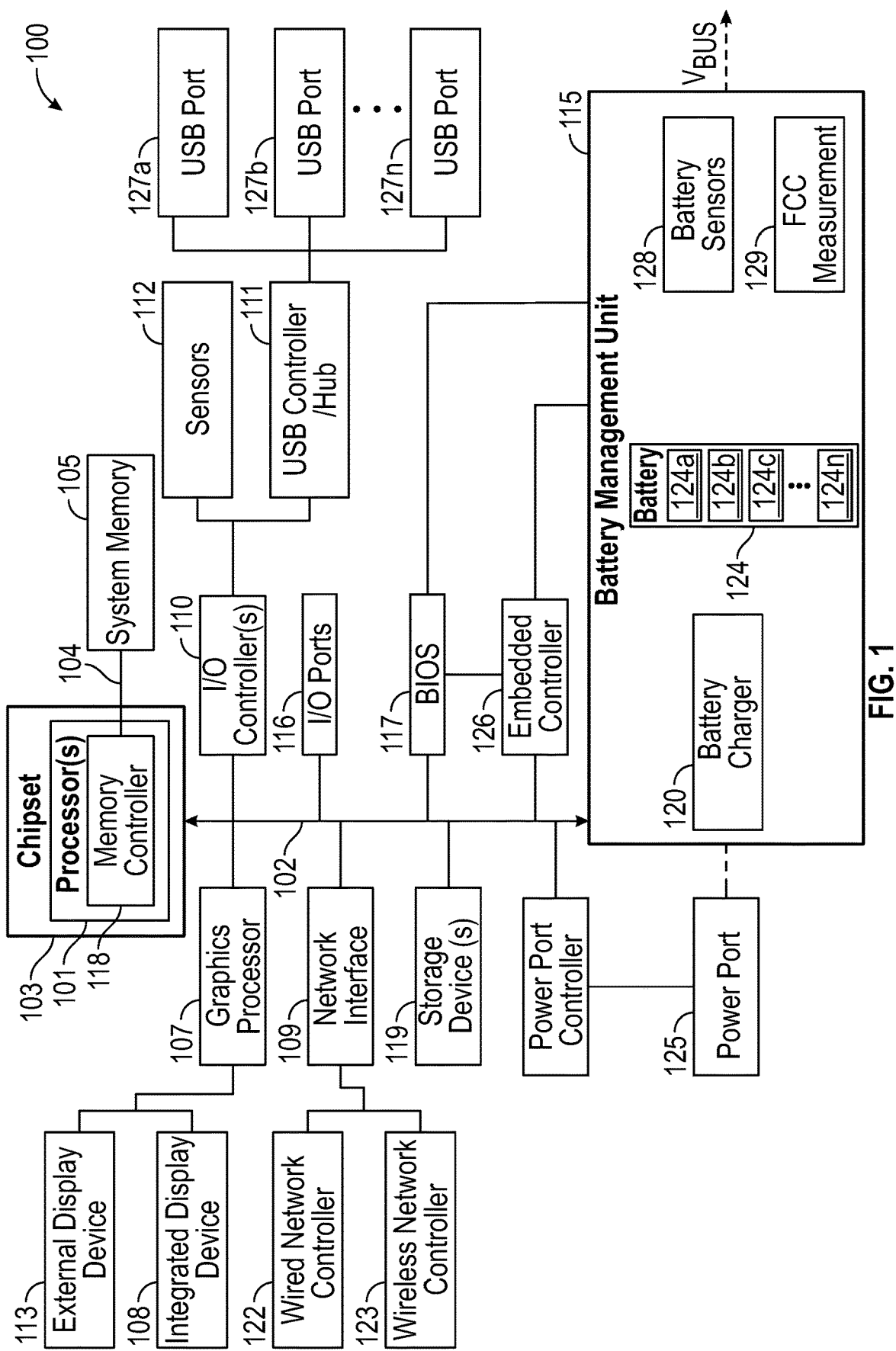
FIG. 1 is a block diagram depicting certain components of an IHS operable according to various embodiments for supporting advanced battery charge capacity forecasting.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, portable IHSs may operate using power drawn from rechargeable batteries. The user of a portable IHS typically alternates between recharging these batteries while the IHS is coupled to a power source and operating the IHS from power drawn during a discharge cycle of these batteries. IHS users vary greatly with regard to the frequency and depth of these discharge cycles. Moreover, an individual user may utilize multiple different portable IHSs and may maintain varying patterns of discharge cycles for each of these IHSs. In some scenarios, users maintain an IHS consistently coupled to a power source, such that the battery is maintained in a fully or mostly charged state with only occasional operation from battery power. These occasional discharge cycles by such users may result in a relatively small portion of the available battery capacity being utilized. In other scenarios, a user may discharge the batteries of an IHS regularly and each of these discharge cycles may utilize all or nearly all of the available battery capacity. A wide variety of such scenarios result in the rechargeable batteries of portable IHSs being subject to a great variability in discharge cycles. As described in additional detail below, in addition to the depth and number of recharge cycles, various additional factors may significantly impact the charge capacity of a rechargeable battery.

While operating from battery power, reports of remaining available battery capacity may be generated and utilized by the user and by automated systems. Systems for reporting the remaining available capacity of a rechargeable battery may base these capacity determinations on the measured full charge capacity (FCC) of the battery. However, because the full charge capacity of a rechargeable battery degrades during the lifespan of a battery, the measured full charge capacity of a battery does not reflect the degradation of the battery between measurements of the full charge capacity. Estimates may be generated for the battery capacity during intervals between these measurements, but inaccurate estimates may result in unused battery capacity, unnecessary loss of use of the IHS and/or battery failure.

FIG. 1 is a block diagram depicting certain components of an IHS 100 operable according to various embodiments for supporting advanced battery charge capacity forecasting. As described in additional detail below, embodiments may utilize a battery management unit 115 for managing the charging of a rechargeable battery system 124, drawing power from battery system 124 and monitoring various aspects of the operation of the battery system 124. In various embodiments, IHS 100 may include an embedded controller 126 that includes logic that executes program instructions, in conjunction with operations by components of battery management unit 115 to perform the operations disclosed herein for supporting advanced forecasting of the charge capacity of battery system 124. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, some operations of BIOS 117 may be implemented as operations of embedded controller 126. Upon powering or restarting IHS 100, processor (s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In some embodiments, BIOS 117 may interface with the battery management unit 115 to retrieve information regarding the operations of the battery system 124. Such battery operation information may be used by BIOS 117 in reporting power consumption information to the operating system applications of IHS 100.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

In management of the supported operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a fully-off power mode.

Embedded controller 126 may also implement operations for interfacing with a battery management unit 115 in managing some of the power operations of IHS 100. In certain instances, the operations of embedded controller may coordinate various power operations of IHS 100, such as interfacing with power port controller 114 to identify a power source coupled to a power port 125 of the IHS 100 and negotiating parameters of the power supplied to IHS 100 via the power port 125. Embedded controller 126 may also configure routing of power to and from external devices coupled to USB ports 1271-n of IHS 100. As described below, in certain instances, repeated high-current power draws on battery system 124 by external devices may result significant degradation in the capacity of battery system 124. In some embodiments, embedded controller 126 may support operating system functions for managing available power, such as user power management preferences. In implementing such power management preferences, embedded controller 126 may interface with battery management unit 115 in determining appropriate charging and discharge modes for battery system 124.

As described, an IHS 100 may be configured to report remaining battery capacity information based on the charge level of the battery system 124 relative to estimates of the full charge capacity of the battery system 124. As described in additional detail below, in some embodiments, embedded controller 126 may generate estimates of the full charge capacity of battery system 124 based on battery operation parameters collected from battery management unit 115. Embedded controller 126 may provide such battery capacity determinations to operating system functions of IHS 100 for reporting to the user of IHS 100. In some embodiments, such battery capacity information generated by embodied controller 126 may additional be provided to BIOS 117 for reporting to hardware components of IHS 100 and in support of power operations supported by BIOS 117. In some embodiments, the alternate power plane utilized by embedded controller 126 may be additionally utilized by BIOS 117 and by battery management unit 115 in collecting and utilizing power information during low-power operations of IHS 100.

IHS 100 may support the use of various power modes. In some embodiments, the power modes of IHS 100 may be implemented through operations of the embedded controller 126 in conjunction with the battery management unit 115. In various embodiments, a portable IHS 100 may support various low power modes in order to reduce power consumption and/or conserve power stored in battery 124 when IHS 100 is not actively in use. The power modes may include a fully-on state in which all, or substantially all, available components of IHS 100 may be fully powered and operational. In an intermediate low-power mode, various components of IHS 100 may be powered down, but IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down. In a fully-off power mode, processor(s) 101 may powered off, any integrated storage devices 119 may be powered off, and/or integrated displays 108 may be powered off. In a fully-off power mode, some minimal charge level may be maintained in battery system 124 in order to support diagnostic operations necessary for initiating charging of battery system 124. Accordingly, in some embodiments embedded controller 126 may be configured to automatically transition to a fully-off mode in response to detecting the estimate capacity of battery system 124 approaching this minimal charge level required to support battery diagnostic operations.

In various embodiments, estimates of the full charge capacity of battery system 124 may be generated based on information collected by battery sensors 128 of battery management unit 115. As described in additional detail below, the parameters of battery operation collected by battery management unit 115 may be utilized in generating accurate forecasts of the full charge capacity of battery system 124, where these forecasts account for specific events and conditions that result in degradation of the charge capacity of a rechargeable battery, such as battery system 124. In various embodiments, battery sensors 128 may include sensors for counting the discharge cycles of battery system 124 and recording the depth of each of these discharge cycles. Battery sensors 128 may also monitor and record the discharge rate of battery system 124 during each of these discharge cycles. In some embodiments, battery sensors 128 may also monitor and record internal battery system 124 temperatures. Battery sensors 128 may also be configured to detect and count various additional battery conditions and events, such as discharges of battery system 124 below one or more voltage thresholds and instances of discharge rates above one or more thresholds.

As illustrated, battery management unit 115 may also include a full charge capacity (FCC) measurement unit 129 that is operable for measuring the charge capacity of battery system 124. In many instances, the battery capacity measurements by the FCC measurement unit are only effective in conditions where the battery system 124 has been discharged below a certain threshold of the estimated remaining capacity. For instance, in some embodiments, the capacity measurement capability of FCC measurement unit 129 are only triggered upon detecting a charge level of battery system 124 that has dropped below approximately 7% of the estimated full charge capacity of the battery system 124. Due to this condition for conducting full charge capacity measurements, battery system 124 may go through numerous discharge cycles without triggering a measurement by measurement unit 129. During intervals between such full charge capacity measurements of battery system 124, power operations must operate based on estimates of the full charge capacity of battery system 124.

As described in additional detail below, estimates that do not account for characteristics of the ongoing use of battery system 124 during these intervals fail to adequately estimate the degradation of the capacity of battery system 124, thus resulting in inaccurate estimates of remaining available battery capacity. Also as described below, in some embodiments, the parameters of battery operations collected by battery sensors 128 and FCC measurement unit 129 may be utilized to train machine learning models of battery capacity degradation. Such machine learning models may collect battery operation parameters from numerous IHSs configured in a similar manner to IHS 100 in order to generate aggregate models of battery degradation. In some embodiments, an additional machine learning model that is particularized to the battery operations of IHS 100 may be operated by embedded controller 126, where this local machine learning model may generate battery capacity correction factors based on the inputs collected from battery management unit 115 and additionally based on inputs provide by the aggregated machine learning models of battery degradation.

In some embodiments, battery management unit 115 may manage the use of power inputs received from power port 125 or from USB ports 127a-n in charging battery system 124. An AC adapter may be coupled to power port 125 to provide IHS 100 with a DC supply of power that is utilized by a battery charger 120 for recharging one or more internal batteries 124 of IHS 100. As illustrated, a battery system 124 utilized by IHS 100 may include one or more cells 124a-n that may connected in series or in parallel. Battery management unit 115 may support various modes for charging the cells 124a-n of battery 124 based on the power supply available to IHS 100 and the charge levels of the battery system 124.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
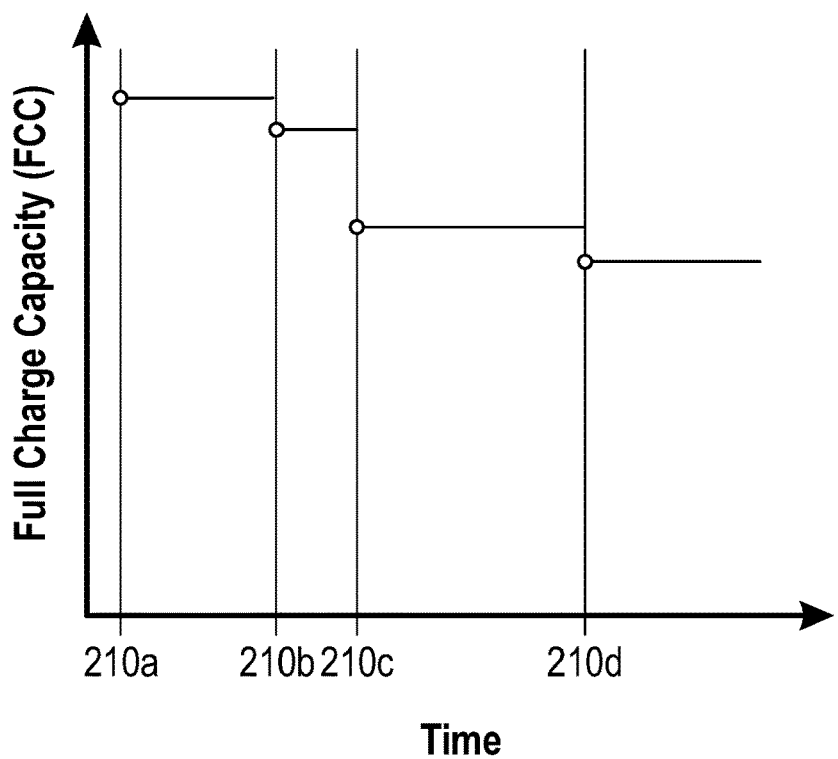
FIG. 2A is a graph diagram illustrating certain aspects of the operation of a system providing battery charge capacity measurements.

FIG. 2A is a graph diagram illustrating certain aspects of the operation of a system providing battery charge capacity measurements. As described, estimates of remaining available battery power are reported to a user of an IHS and to certain power operations of an IHS. In some scenarios, estimates of remaining battery power may be reported to the user in the form of a percentage of battery capacity that is charged and available for use. Such estimates of available battery capacity may also be used in determining when to trigger automatic transitions of an IHS to a low-power or fully-off power state in order to preserve some charge in the battery. For many rechargeable batteries, a minimum charge level may be maintained by the battery since a complete discharge may result in damage to the battery and/or significant degradation in the full charge capacity of the battery. Rechargeable battery systems may be configured to maintain a minimum charge in order to support diagnostic operations needed to re-initiate charging of the battery system.

Estimates of remaining available battery power may be generated based on the charge level stored by a battery in relation to the full charge capacity of the battery. As described, the battery management unit of the IHS may include a capability for measuring full charge capacity of a battery system. The full charge capacity of rechargeable batteries degrades over time, with the rate of degradation affected by several factors. However, the actual full charge capacity of a rechargeable battery is not accurately known without conducting a measurement of the full charge capacity of the battery. For many rechargeable batteries, such full charge capacity measurements require discharging the battery below a low-voltage threshold. In some instances, this low-voltage threshold four triggering a measurement of full charge capacity of a battery is satisfied by discharging a battery to approximately 7% of its estimated capacity. Accordingly, full charge capacity measurements may be conducted only occasionally, and in some cases, may be conducted rarely.

FIG. 2A illustrates a series of full charge capacity measurements of a rechargeable battery, with the successive measurements reflecting degradation of the full charge capacity of the battery over time. At time 210a, an initial full charge capacity measurement of the battery is taken. That initial full charge capacity measurement is utilized until time 210b, when a second full charge capacity measurement is taken. This updated full charge capacity measurement taken at time 210b is lower than the initial full charge capacity, thus reflecting the battery degradation during this interval. The second full charge capacity measurement is utilized during the next interval until a third full charge capacity measurement is taken at time 210c, thus providing the amount of battery degradation during this second interval. At time 210d, another full charge capacity measurement is taken, thus providing the amount of further degradation during a third interval of battery use. As reflected in FIG. 2A, these intervals between full charge capacity measurements may be of varying lengths.

Figure 2B:
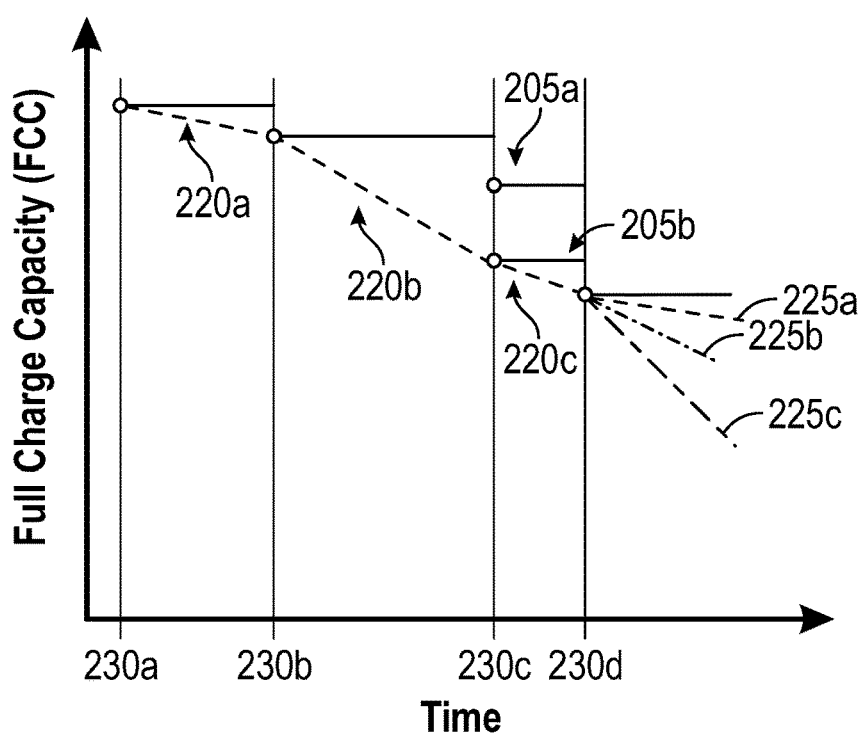
FIG. 2B is a graph diagram illustrating certain aspects of the operation of a system providing battery charge capacity estimates.

FIG. 2B is a graph diagram illustrating certain aspects of the operation of a system providing battery charge capacity estimates. As described, estimates of remaining battery capacity may be used to provide users with battery status reports, such as a percentage of remaining battery capacity that is available for use. Such estimates may attempt to account for battery degradation since the last full charge capacity measurement of the battery. Without using estimates that account for battery degradation, significant discrepancies may arise between the actual remaining battery capacity and reported remaining battery capacity, potentially resulting in battery failure. FIG. 2B illustrates one technique for generating estimates of the full charge capacity of a battery between measurements of the actual full charge capacity of the battery.

At time 230a, an initial full charge capacity measurement is taken. During the interval until time 230b, this initial full charge capacity measurement is the only actual measurement of the battery capacity that is available for use in generating reports of remaining available battery capacity. Accordingly, during this interval an estimated full charge capacity measurement 220a may be utilized. In certain instances, this estimated capacity measurement 220a may simply apply a constant rate of battery degradation throughout the interval in order to provide updated estimates of the battery capacity. At time 230b, a second full charge capacity measurement is taken and is the only actual measurement of battery capacity during the interval until the subsequent measurement at time 230c. As illustrated, these intervals between battery capacity measurements may vary in length. During this second interval, estimated capacity measurements 220b may be utilized that again apply a constant rate of battery degradation throughout this interval.

After this prolonged second interval without a battery capacity measurement, at time 230c, a third battery capacity measurement is conducted. During this third interval, an estimated capacity measurement 220c again applies a constant rate of battery degradation during this third interval. At time 230d, a fourth battery capacity measurement is conducted. As illustrated, three potential battery capacity estimates 225a-c may be selected for use during this interval, with each of these estimates applying a different rate of degradation. The selection of a rate of degradation, and thus the selection of one of the battery capacity estimates 225a-c, may be based on observed rates of degradation during prior intervals. However, such estimates do not take into account characteristics of battery utilization during the current interval, thus resulting in the potential for significant discrepancies between estimated battery capacity and actual battery capacity.

For instance, at time 230c, two possible battery capacity measurements 205a, 205b are illustrated. One of the battery capacity measurements 205b conforms to the battery degradation of the estimated battery capacity 220b during the interval from time 230b. In such scenarios, estimated battery capacity 220b is thus a reasonably accurate projection of the actual battery capacity degradation during this interval. Such accuracy may be attributed to the estimated battery capacity 220b applying a degradation rate that is consistent with prior degradation rates of the battery and battery operations that are consistent across the intervals. However, in some scenarios, user behavior or other circumstances may result in actual degradation being significantly different during these two intervals. For instance, during the second interval, the IHS may have been mostly coupled to a power source and subjected to few events and conditions that contribute to battery degradation. Accordingly, in such scenarios, the actual battery degradation may instead be reflected by the battery capacity measurement 205a, which does not conform to the estimated battery capacity 220b. In such circumstances, the use of estimates that do not account for actual circumstances of battery discharges during this interval may result in discrepancies between the battery capacity estimates and the actual battery capacity. In scenarios such as in FIG. 2B, where a battery capacity estimate 220b is lower than the actual capacity 205a, discrepancies may result in loss of use of an IHS. Users may be provided with incorrect battery power information, thus causing the users to prematurely power down an IHS. Automatic battery protection mechanisms may also prematurely power down an IHS based on such flawed battery capacity estimates.

Figure 2C:
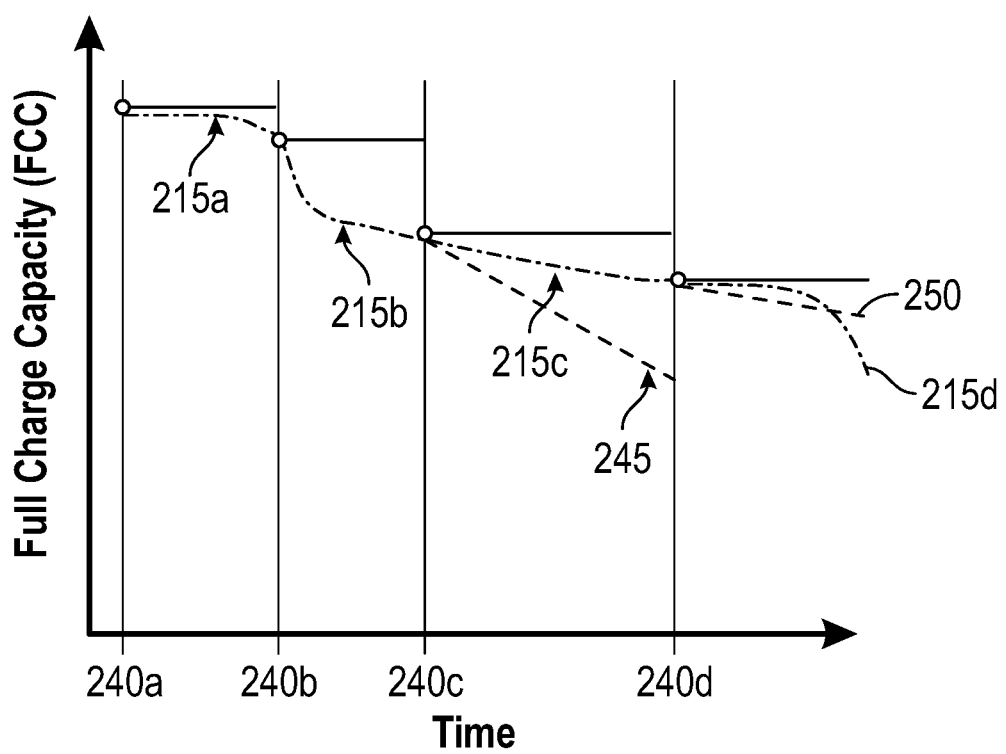
FIG. 2C is a graph diagram illustrating certain aspects of the operation of a system providing advanced battery charge capacity forecasting according to various embodiments.

FIG. 2C is a graph diagram illustrating certain aspects of the operation of a system providing advanced battery charge capacity forecasting according to various embodiments. As described, the full charge capacity of a rechargeable battery degrades based on various events and conditions during use of the battery, such as the number and depth of battery discharge cycles. As described with regard to FIG. 2B, estimates of the full charge capacity of a battery that do not account for conditions of actual battery use may result in inaccurate estimates of available battery power. Accordingly, embodiments may be configured to generate battery capacity forecasts that account for historical battery use as well as ongoing use of battery since the last full charge capacity measurement, where such battery capacity forecasts may be used during intervals between battery capacity measurements.

As described with regard to FIG. 1, a battery management unit of an IHS may be configured to collect various parameters pertaining to battery operations, including battery capacity measurements and information describing the use and discharge cycles of the battery. This collected battery information may then be provided as inputs to machine learning systems that generate battery capacity correction factors that may be used by the IHS to generate accurate battery capacity forecasts. As described in additional detail regard to FIG. 3, such battery capacity forecasts may be initially generated for a particular IHS based on aggregated battery operation information received from numerous IHSs and may subsequently be generated based on battery operation information from that particular IHS, thus providing battery capacity estimates that account for the battery operations of that specific IHS.

FIG. 2C illustrates battery capacity forecasts that are generated according to such embodiments, where the forecasts are used during intervals between full charge capacity measurements of a battery. At time 240a, an initial battery capacity measurement is conducted and remains the operative battery capacity measurement until a second measurement is taken at time 240b. In this scenario, battery capacity forecasts 215a are generated during this interval by a machine learning model that has been trained using aggregated battery operation information. Initially, the battery capacity forecasts 215a are generated based solely on this aggregated battery model. As the IHS reports collected parameters of battery operation, those inputs to the machine learning models are used to generate particularized battery capacity forecasts. The battery capacity forecasts 215a during this initial interval reflect machine learning estimates that presume ideal battery operations that result in minimal initial degradation, but that also generate estimates of greater degradation over time as reported battery operations indicate battery operations associated with moderate battery degradation.

At time 240b, a second battery capacity measurement is conducted. As illustrated, this second interval continues for longer that than the first interval and until a third battery capacity measurement is conducted at time 240c. As reflected in the battery capacity forecasts 215b generated by the machine learning model during this second interval, the operational use of the battery has resulted in expectations of significant and rapid battery capacity degradation during this interval. For instance, the battery may have been subjected to a large number of discharge cycles that resulted in deep and rapid discharges. Such characteristics of battery management unit operations are monitored, as described with regard to FIG. 1, and provided as machine learning inputs. Based on such reported battery operations, the machine learning model generates battery capacity forecasts 215b that reflect an expected rapid degradation of battery capacity. This degradation is confirmed at the subsequent battery capacity measurement conducted at time 240c.

During the third interval of battery operations that are subject to the battery capacity measurements taken at time 240c, the battery is now regularly charged with infrequent instances of deep discharge cycles. This change in battery operations is reflected in battery capacity forecasts 215c generated by the machine learning model during this interval. Without accounting for actual battery operations during this third interval, estimates of battery capacity would be based on observed battery degradation during prior intervals, such as described with regard to FIG. 2B. In the scenario illustrated in FIG. 2B, such a battery capacity estimate 245 is illustrated, where this estimate presumes a high rate of degradation that is commensurate with the rate of degradation observed during the prior interval. As illustrated, such a battery capacity estimate 245 results in a significant discrepancy from the actual battery capacity measurement taken at time 240d. Such a discrepancy is eliminated by the battery capacity forecasts 215c generated during this interval by the machine learning model that accounts for the improved care of the battery during this interval.

As illustrated in the battery capacity forecast 215d, during the initial portion of a fourth interval that commences with the battery capacity measurement taken at time 240d, battery operations continue to indicate minimal degradation. However, continued battery operation monitoring indicates another period of rapid and deep discharges of the battery during a second portion of this fourth interval. These inputs to the machine learning model are reflected in the rapid battery degradation anticipated by the battery capacity forecast 215d. As illustrated, an estimate 250 of battery capacity that is generated based on degradation observed during the prior interval would result in a discrepancy that overestimates battery capacity relative to the battery capacity forecast 215d that accounts for the occurrence of high degradation events observed during second portion of this interval.

Figure 3:
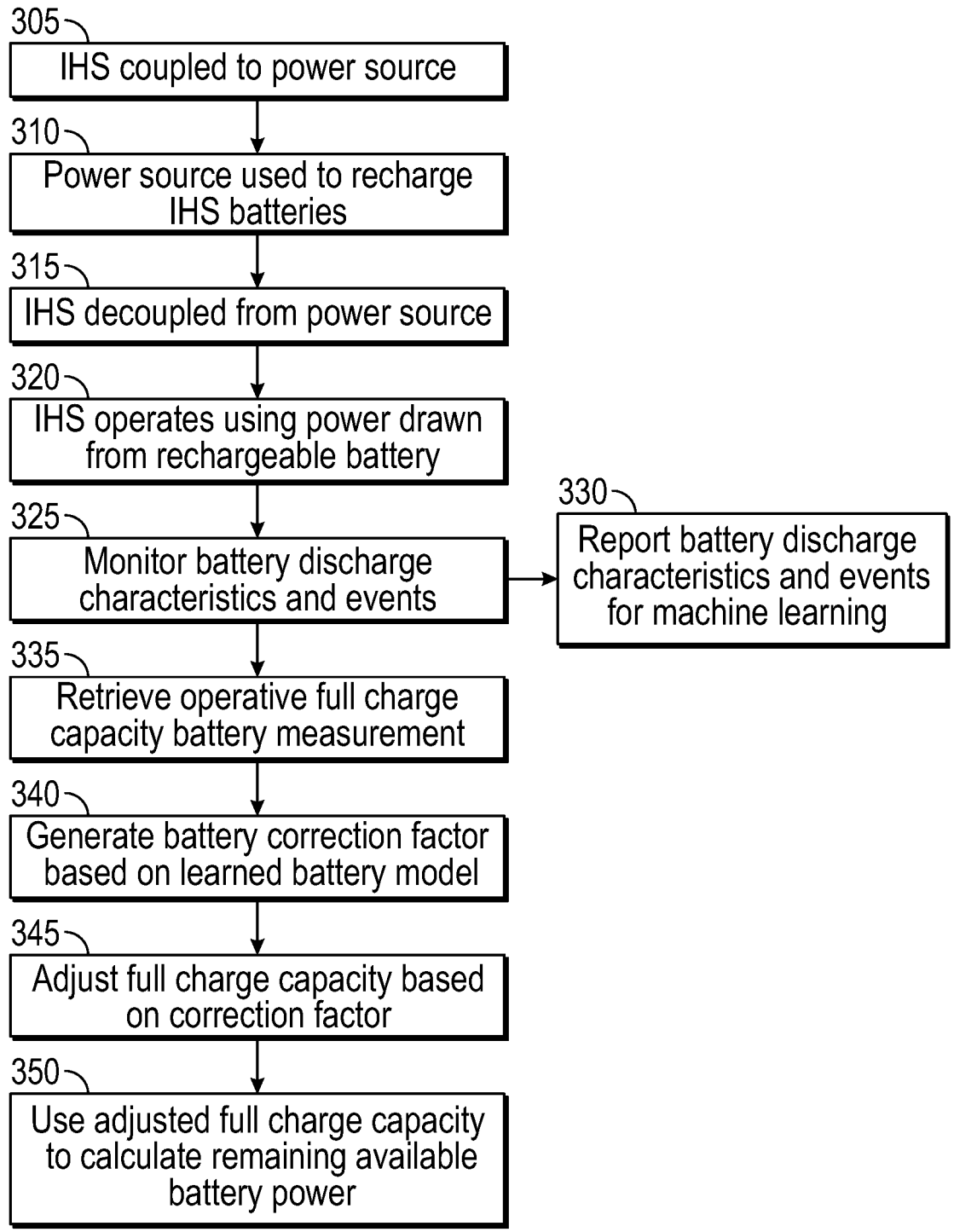
FIG. 3 is a flow chart diagram illustrating certain steps of a process according to various embodiments for supporting advanced battery charge capacity forecasting.

FIG. 3 is a flow chart diagram illustrating certain steps of a process according to various embodiments for supporting advanced battery charge capacity forecasting. In some scenarios, embodiments may begin at block 305 with the coupling of an IHS to a power source, such as via an AC adapter coupling. With the IHS coupled to a power source, at block 310, power drawn from the source is used to recharge batteries of the IHS, such as by operations of the battery management unit described with regard to FIG. 1. At block 315, the IHS is decoupled from the power source and, at block 320, the IHS begins operations in which operating power is drawn from the battery system.

As described with regard to FIG. 1, the battery management unit of an IHS may be configured to collect various parameters of battery operations, such as characteristics of battery discharge cycles. At block 325, the monitored battery operation parameters may be collected from the battery management unit by an embedded controller of the IHS. At block 330, the collected battery operation parameters may be reported for use in further development of aggregated machine learning models of battery degradation. As described, an IHS may be configured to provide users with an estimate of the available battery capacity. In addition, such estimates of remaining available battery capacity may be used by the embedded controller to trigger automatic transitions to low-power states. In support of such capabilities, at block 335, the operative full charge capacity measurement of the battery is retrieved. As described, battery management unit may include logic for generating a full charge capacity measurement of the battery system, where such measurements may be triggered by discharges of the battery below a certain threshold. The battery management unit may store the operative full charge capacity measurement, as well as prior full charge capacity measurements and the times at which the measurements were generated.

In order to account for battery capacity degradation since the time of the operative full charge capacity measurement of the battery, at block 340, a correction factor may be generated for the battery capacity. In some embodiments, this correction factor may be generated as an output of the machine learning model of battery degradation. During initial use of a rechargeable battery, correction factors may be generated using a machine learning model of battery degradation trained based on aggregated battery operations from battery degradation data collected from multiple IHSs, such as the IHSs of a corporate network or from IHSs participating in a data monitoring and collection initiative. As use of this battery continues and characteristics of the operation of the battery are collected for a particular IHS, the aggregated machine learning model of battery degradation may be adapted to the battery operations for that specific IHS. In this manner, a particularized model of battery degradation may be generated for a specific IHS, thus accounting for the specific patterns of battery operation by a particular user during intervals between battery capacity measurements.

By utilizing a battery degradation machine learning model that accounts for ongoing battery operations, more accurate estimates of available battery capacity may be provided in between battery capacity measurements. For example, a user may alternate between intervals where an IHS is maintained in a mostly charged state and intervals where an IHS is regularly discharged deeply in a rapid manner, such as for powering external devices during travel. By monitoring such battery discharge characteristics, the battery management unit generates inputs used by machine learning model to generate a battery capacity correction factor that accounts for both the intervals of low degradation and the intervals of high degradation resulting from the discharge of the battery to power external devices. In another example, the battery management unit may detect specific events that are recognized as resulting in significant reductions in the full charge capacity of a battery. For instance, a user may neglect to connect an IHS to a power source for a prolonged period of time, resulting in a complete discharge of the battery, thus causing significant battery degradation. The battery management unit may also detect high temperature events that may result from various battery operations, such as rapid discharge rates from the battery and exposure of the IHS to high temperatures.

In addition to or in alternative to monitoring for battery events that adversely affect battery degradation, in some embodiments, the collected battery operation information may be evaluated over time in order to identify conditions of battery use that adversely affect battery degradation. For instance, temperature data may be tracked over time in order to detect intervals of battery use within various temperature zones. Durations of battery use within each of the monitored temperature zones may indicate different rates of battery degradation. By reporting actual battery degradation information to the machine learning model in the form of full charge capacity measurements, the effects on battery degradation by intervals of battery operations within each of the temperature zones may be identified and used in providing a correction factor that accounts for the conditions in which the battery is being used.

In some embodiments, this use of aggregated temperature zone information may be used by machine learning models to generate general temperature zone correction factors that may be applied as inputs to a particularized machine learning model of a specific battery system. In this manner, generalized battery degradation machine learning models may be continuously trained using aggregated battery operation information from numerous IHSs, while also using this aggregated battery degradation information as correction factor inputs to particularized battery degradation models. For instance, battery information such as the discharge rate may be similarly monitored and characterized within discharge rate zones. Intervals of discharge rates within each of the zones may be identified and provided as additional inputs to aggregated degradation machine learning models. In conjunction with reported battery degradation in the form of full charge capacity measurements, discharge rate zone information may be evaluated by machine learning models in characterizing the impact of discharge rates on battery degradation.

Based on such monitored battery operations, the particularized battery capacity machine learning model may be used to generate a battery capacity correction factor that accounts for ongoing battery operations between battery capacity measurements. At block 345, this correction factor may be used to adjust the battery capacity measurement that is used to report, at block 350, the remaining available battery power to the user and to the systems of the IHS that operate using this information. By providing more accurate reports of remaining available battery power in this manner, the IHS may remain available to the user for longer durations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for powering a first Information Handling System (IHS), the method comprising:
    initiating a first measurement of a capacity of a rechargeable battery of the first IHS;
    monitoring a plurality of parameters of use of the rechargeable battery;
    until a second measurement of the capacity of the rechargeable battery is initiated, wherein no additional capacity measurements of the rechargeable battery are made until the second measurement of the rechargeable battery is initiated:
        without any additional capacity measurements of the rechargeable battery being made, generating a battery capacity correction factor based on the monitored parameters of the use of the rechargeable battery;
        adjusting the first capacity measurement using the generated correction factor; and
        until the second capacity measurement is initiated, reporting the adjusted first capacity measurement of the rechargeable battery.

2. The method of claim 1, wherein the first capacity measurement is initiated in response to detecting the remaining available capacity below a specified threshold.

3. The method of claim 1, wherein a difference between the first capacity measurement and the second capacity measurement corresponds to degradation of a full charge capacity of the rechargeable battery during the time interval between the first capacity measurement and the second capacity measurement.

4. The method of claim 1, wherein a portion of the monitored parameters of the use of the rechargeable battery are collected by a battery management unit of the first IHS.

5. The method of claim 1, wherein the monitored parameters of the use of the rechargeable battery comprise a number of discharge cycles and a depth of discharge cycles of the rechargeable battery.

6. The method of claim 1, wherein the monitored parameters of the use of the rechargeable battery comprise intervals of discharge rate of the rechargeable battery within a discharge rate zone.

7. The method of claim 1, wherein the monitored parameters of the use of the rechargeable battery comprise detected temperatures of the rechargeable battery.

8. The method of claim 1, wherein the monitored parameters of the use of the rechargeable battery comprise intervals of detected temperatures of the rechargeable battery within a temperature zone.

9. The method of claim 1, wherein the battery capacity correction factor is generated by a first machine learning model trained in part using aggregated parameters of use of rechargeable battery of a plurality of IHSs.

10. The method of claim 1, wherein the battery capacity correction factor is further generated by a second machine learning model trained in part using monitored parameters of the use of the rechargeable battery of the first IHS.

11. An Information Handling System (IHS) comprising:
    one or more processors;
    a memory device coupled to the one or more processors, the memory device storing computer-readable instructions that, upon execution by the one or more processors, cause execution of an operating system of the IHS;
    a rechargeable battery system; and
    an embedded controller comprising a memory having program instructions stored thereon that, upon execution by a logic unit of the embedded controller, cause the embedded controller to:
        initiate a first measurement of a capacity of the rechargeable battery system;
        monitor a plurality of parameters of use of the rechargeable battery system;
        until a second measurement of the capacity of the rechargeable battery is initiated, wherein no additional capacity measurements of the rechargeable battery are made until the second measurement of the rechargeable battery system is initiated:
            without any additional capacity measurements of the rechargeable battery system being made, generate a battery capacity correction factor based on the monitored parameters of the use of the rechargeable battery system;
            adjust the first capacity measurement using the generated correction factor; and
            until the second capacity measurement is initiated, report the adjusted first capacity measurement of the rechargeable battery system.

12. The IHS of claim 11, wherein the first capacity measurement is initiated in response to detecting the remaining available capacity below a specified threshold.

13. The IHS of claim 11, wherein a difference between the first capacity measurement and the second capacity measurement corresponds to degradation of a full charge capacity of the rechargeable battery system during the time interval between the first capacity measurement and the second capacity measurement.

14. The IHS of claim 11, wherein a portion of the monitored parameters of the use of the rechargeable battery system are collected by a battery management unit of the rechargeable battery system.

15. The IHS of claim 11, wherein the monitored parameters of the use of the rechargeable battery system comprise at least one of: a number of discharge cycles of the rechargeable battery system, a depth of discharge cycles of the rechargeable battery, intervals of discharge rate of the rechargeable battery system within a discharge rate zone, detected temperatures of the rechargeable battery system, and intervals of detected temperatures of the rechargeable battery system within a temperature zone.

16. An Information Handling System (IHS) comprising:
    one or more processors;
    a memory device coupled to the one or more processors, the memory device storing computer-readable instructions that, upon execution by the one or more processors, cause execution of an operating system of the IHS;
    a rechargeable battery system; and
    an embedded controller comprising a memory having program instructions stored thereon that, upon execution by a logic unit of the embedded controller, cause the embedded controller to:
        initiate a first measurement of a capacity of the rechargeable battery system;
        monitor a plurality of parameters of use of the rechargeable battery system;
        until a second measurement of the capacity of the rechargeable battery is initiated, wherein no additional capacity measurements of the rechargeable battery are made until the second measurement of the rechargeable battery system is initiated:
            without any additional capacity measurements of the rechargeable battery system being made, generate a battery capacity correction factor based on the monitored parameters of the use of the rechargeable battery system;

adjust the first capacity measurement using the generated correction factor; and until the second capacity measurement is initiated, report the adjusted first capacity measurement of the rechargeable battery system.

17. The storage device of claim 16, wherein the first capacity measurement is initiated in response to detecting the remaining available capacity below a specified threshold.

18. The storage device of claim 16, wherein a difference between the first capacity measurement and the second capacity measurement corresponds to degradation of a full charge capacity of the rechargeable battery during the time interval between the first capacity measurement and the second capacity measurement.

19. The storage device of claim 16, wherein a portion of the monitored parameters of the use of the rechargeable battery are collected by a battery management unit of the IHS.

20. The storage device of claim 16, wherein the monitored parameters of the use of the rechargeable battery comprise at least one of: a number of discharge cycles of the rechargeable battery, a depth of discharge cycles of the rechargeable, intervals of discharge rate of the rechargeable battery within a discharge rate zone, detected temperatures of the rechargeable battery, and intervals of detected temperatures of the rechargeable battery within a temperature zone.

* * * * *